(12) United States Patent
Sterczewski et al.

(10) Patent No.: US 11,015,975 B2
(45) Date of Patent: May 25, 2021

(54) FAST COMPUTATIONAL PHASE AND TIMING CORRECTION FOR MULTIHETERODYNE SPECTROSCOPY

(71) Applicant: The Trustees of Princeton University, Princeton, NJ (US)

(72) Inventors: Lukasz Sterczewski, Plainsboro, NJ (US); Jonas Westberg, Princeton, NJ (US); Gerard Wysocki, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/613,614

(22) PCT Filed: May 15, 2018

(86) PCT No.: PCT/US2018/032731
§ 371 (c)(1),
(2) Date: Nov. 14, 2019

(87) PCT Pub. No.: WO2018/213286
PCT Pub. Date: Nov. 22, 2018

(65) Prior Publication Data
US 2020/0109988 A1   Apr. 9, 2020

Related U.S. Application Data

(60) Provisional application No. 62/506,198, filed on May 15, 2017.

(51) Int. Cl.
*G01J 3/10* (2006.01)
*G01J 3/427* (2006.01)

(52) U.S. Cl.
CPC ............... *G01J 3/10* (2013.01); *G01J 3/427* (2013.01); *G01J 2003/104* (2013.01)

(58) Field of Classification Search
None
See application file for complete search history.

(56) References Cited

U.S. PATENT DOCUMENTS

2013/0342836 A1* 12/2013 Newbury ............... G01J 3/453
356/326
2018/0073856 A1*  3/2018 Cundiff .................. G01N 21/31
(Continued)

OTHER PUBLICATIONS

Burghoff et al.: "Computational multiheterodyne spectroscopy", Science Advances 2016; No. 2, Nov. 11, 2016.
(Continued)

*Primary Examiner* — Shawn Decenzo
(74) *Attorney, Agent, or Firm* — Meagher Emanuel; Laks Goldberg & Liao, LLP

(57) ABSTRACT

Disclosed herein is an all-digital phase and timing correction procedure for coherent averaging in dual-comb and multiheterodyne spectroscopy—applicable to any dual-comb spectroscopy setup. It can account for large frequency/phase instabilities of the used sources, yielding a significant reduction of the noise pedestal and an increase in signal-to-noise ratio (SNR) of the radio frequency (RF) beat notes. This technique is computationally efficient and can be conveniently implemented either as a post-processing algorithm or in a real-time data acquisition and processing platform without the necessity of adding any additional optical elements to the dual-comb spectroscopy system. By implementing this technique, the performance of any comb- or comb-like-source-based DCS system with a sufficient degree of mutual coherence between the optical modes can be improved in terms of SNR and number of spectroscopically-usable RF beat notes. The described technique is compatible with a DC-centered RF spectrum, where the negative frequencies are folded to the positive domain to double the number of beat notes within the detector band- (Continued)

width. The technique enables coherent averaging over extended time-scales even for free-running combs, thus increasing the sensitivity of absorption and dispersion DCS measurements.

30 Claims, 13 Drawing Sheets

(56) References Cited

U.S. PATENT DOCUMENTS

| | | | | |
|---|---|---|---|---|
| 2019/0278151 | A1* | 9/2019 | Kwon | G01J 3/42 |
| 2019/0280450 | A1* | 9/2019 | Heckl | H01S 3/067 |
| 2020/0006912 | A1* | 1/2020 | Lancaster | H01S 3/1307 |
| 2020/0014167 | A1* | 1/2020 | Rolland | H01S 3/136 |
| 2020/0400495 | A1* | 12/2020 | Kippenberg | G01J 3/108 |

OTHER PUBLICATIONS

Ideguchi et al.: "Adaptive real-time dual-comb spectroscopy", Nature Communications, Feb. 27, 2014, DOI: 10.1038.
Roy et al.: "Continuous real-time correction and averaging for frequency comb interferometry", Opt. Express 20, 21932-21932 (2012).
Bourbeau Hebert et al.: "Self-corrected chip-based dual-comb spectrometer", Opt. Express 25, 8168-8179 (2017).
International Search Report and Written Opinion for International Application No. PCT/US2018/032731, dated Sep. 13, 2018.
Sterczewski, L. et al. "Tuning properties of mid-infrared Fabry-Perot quantum cascade lasers for multiheterodyne spectroscopy", Photonics Letters of Poland, vol. 8 (4), 113-115, Dec. 31, 2016.
Ideguchi, T. et al. "Adaptive real-time dual-comb spectroscopy", Nature Communications, 5:3375, pp. 1-8, Feb. 27, 2014.
Sterczewski, L. et al. "Multiheterodyne spectroscopy using interband cascade lasers," Opt. Eng. vol. 57(1), 011014, Sep. 19, 2017.

* cited by examiner

CEO Fluctuations - All Modes Shift Equally

Repetition Fluctuations - Spectrum "Breathes", Different Modes Shift Differently

FAST COMPUTATIONAL PHASE AND TIMING CORRECTION FOR MULTIHETERODYNE SPECTROSCOPY

CROSS-REFERENCE TO RELATED APPLICATIONS

This application claims priority to provisional application 62/506,198, filed on May 15, 2017, which is herein incorporated by reference in its entirety.

STATEMENT REGARDING FEDERALLY SPONSORED RESEARCH OR DEVELOPMENT

This invention was made with government support under Grant No. W31P4Q-16-1-001 awarded by the U.S. Army. The government has certain rights in the invention.

BACKGROUND OF THE INVENTION

The present invention relates generally to multiheterodyne spectroscopy or dual-comb spectroscopy and more particularly phase and timing correction procedure for the aforementioned techniques.

Multiheterodyne spectroscopy (MHS) or dual-comb spectroscopy (DCS) has attracted much attention in recent years due to its potential for small-footprint, moving-parts-free and fast acquisition (in the microsecond range) of high resolution spectra covering large optical bandwidths. The light sources used for MHS/DCS have historically been limited to femtosecond oscillators, micro-resonators, or electro-optic combs due to the strict requirements on frequency stability, but lately Fabry-Perot quantum cascade lasers (FP-QCLs) have also demonstrated broadband optical frequency comb generation with an unprecedented potential for miniaturization, although reliable operation is typically limited to a small range of temperatures and currents. Beyond the narrow comb regime, these lasers suffer from large oscillations of repetition rate and offset frequency, which hinders their ability to perform high resolution MHS/DCS due to increased phase noise.

Despite this, the spectroscopic information is still encoded in the beating signal (interferogram) even in the noisy operation regime, and it can be recovered by employing adaptive sampling techniques. Conventional adaptive sampling techniques are usually implemented by introducing additional continuous wave (CW) lasers as frequency references and electronic feedback, which unfortunately complicates the MHS/DCS configuration.

Several different phase correction methods have been suggested in order to perform coherent averaging in MHS/DCS systems by suppressing the unwanted measurement instabilities of free running frequency combs. One recent proposal was a computational phase and timing correction methodology based on Kalman filtering, which can handle extreme multiheterodyne beat note instabilities and RF spectrum congestion due to overlapping beat notes. Despite the excellent performance of this method, there are some practical limitations due to the computational complexity of the Kalman filter, as well as the requirement of a-priori knowledge of the number of modes, N, contributing to the RF spectrum, which may limit its real-time phase correction performance even in systems with a lower number of multiheterodyne beat notes.

Thus, there is a need for a less complex but equally effective computational procedure that can be implemented to perform the phase correction.

SUMMARY OF THE INVENTION

According to various embodiments, a multiheterodyne spectroscopy (MHS) or dual-comb spectroscopy (DCS) system including a sample being a liquid, gaseous, or solid form substance is disclosed. The system includes a first laser light source and a second laser light source. The first laser light source generates a first light beam having a first optical path and is directed toward a first beam splitter/combiner that creates two light beams, one directed toward the sample and the other directed toward a second beam splitter/combiner, resulting in a pre-sample first laser light beam and a post-sample first laser light beam, respectively. The second laser light source generates a second light beam having a second optical path and is directed toward a third beam splitter/combiner that generates a first and second laser light beams. The second and third beam splitter/combiners are configured to combine the first and second light beams from the second laser light source with the pre-sample first laser light beam and the post-sample first laser light beam, resulting in a pre-sample combined light beam and a post-sample combined light beam. The system further includes a first photodetector configured to detect the pre-sample combined light beam and a second photodetector configured to detect the post-sample combined light beam. The first and second photodetectors are coupled to an analog to digital converter having an electrical output coupled to a computational adaptive sampling (CAS) module. The CAS module includes at least one band pass filter, a frequency mixer, a low pass filter, a phase shifter, and an adaptive resampler. The system also includes a digital signal processor being configured to generate an output characterizing the sample.

According to various embodiments, a multiheterodyne spectroscopy (MHS) or dual-comb spectroscopy (DCS) system including a sample being a liquid, gaseous, or solid form substance is disclosed. The system includes a first laser light source and a second laser light source. The system further includes one or more photodetectors configured to detect a light beam derived from the first and second laser light sources. The system also includes a signal processor being configured to generate an output characterizing the sample, where the signal processor includes a computational adaptive sampling (CAS) module. The CAS module includes at least one band pass filter, a frequency mixer, a low pass filter, a phase shifter, and an adaptive resampler.

According to various embodiments, a multiheterodyne spectroscopy (MHS) or dual-comb spectroscopy (DCS) system including a sample being a liquid, gaseous, or solid form substance is disclosed. The system includes a first laser light source and a second laser light source. The system further includes one or more photodetectors configured to detect a light beam derived from the first and second laser light sources. The system also includes an analog to digital converter coupled to the one or more photodetectors and a digital signal processor coupled to the analog to digital converter, where the digital signal processor is configured to generate an output characterizing the sample. The digital signal processor includes a digital phase-locked loop (DPLL) module comprising a digital difference frequency generator (DDFG), an IQ demodulator, an adaptive resampler, and a frequency tracker.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Figure 1:
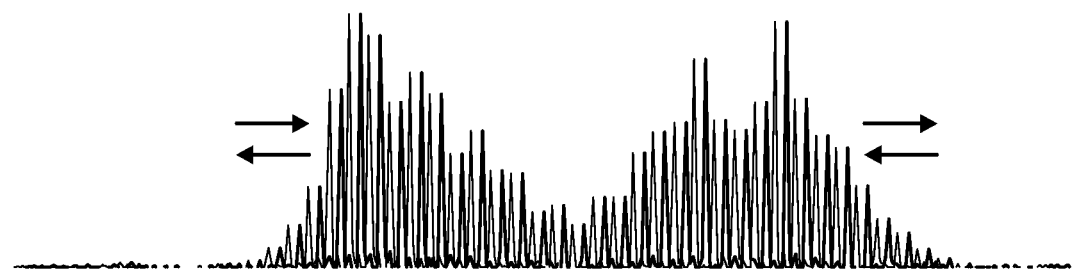
FIG. 1 is a graph illustrating frequency instabilities in frequency combs according to an embodiment of the present invention.
Figure 1:
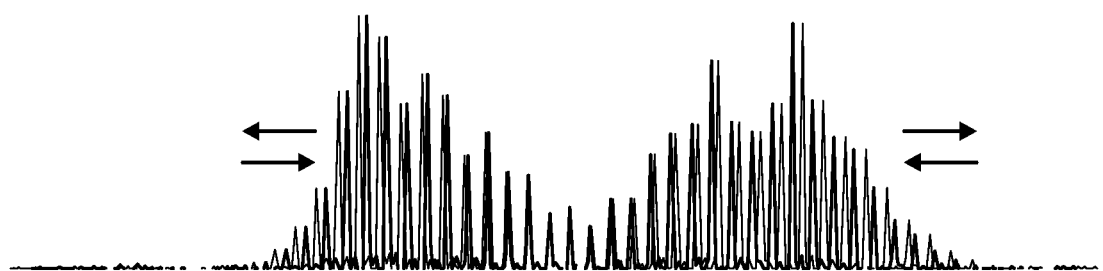

Disclosed herein is a new signal processing approach for multiheterodyne or dual-comb spectroscopic sensing. A computational adaptive sampling (CAS) technique is an all-digital phase and timing correction procedure for DCS and/or MHS. The CAS technique can be conveniently implemented either as a post-processing algorithm or in a real-time data acquisition and processing platform. The CAS technique significantly narrows the bandwidth occupied by the DCS/MHS beat notes, which enables efficient noise suppression in amplitude and phase information retrieval for DCS/MHS as disclosed in more detail below.

Disclosed herein is also an improvement to the CAS technique for multiheterodyne or dual-comb spectroscopic sensing. A digital phase-locked loop (DPLL) methodology is an all-digital phase and timing correction procedure that is designed with real-time implementation in mind. The procedure acts directly from the time-domain electrical photodetector signal and can be implemented in hardware, e.g. using a field-programmable gate array (FPGA) technology or application-specific integrated circuit (ASIC) technology.

CAS and DPLL is applicable to any DCS setup. It can account for large frequency/phase instabilities of the sources under the condition that the instantaneous beat notes in the radio frequency (RF) spectrum are resolvable. Application of these techniques yield significant reduction in the noise pedestal and an increase in signal-to-noise ratio (SNR) of the RF beat notes, effectively increasing the instantaneous spectral coverage of a DCS/MHS instrument and allowing for coherent averaging over extended time-scales. If the radio frequency components are not fully resolvable, it can correct for timing fluctuations using the self-mixing signal, thereby cancelling the non-equidistance of the RF comb lines.

CAS and DPLL can be conveniently implemented either as a post-processing algorithm or in a real-time data acquisition and processing platform, such as an FPGA, without the necessity of adding any additional optical elements to the basic DCS/MHS system. This has been tested with noisy Fabry-Perot interband cascade lasers (FP-ICLs) or Fabry-Perot quantum cascade lasers (FP-QCLs), but its general functionality can be easily extended to other sources (such as micro-ring resonator-based frequency combs, or combs based on electro-optic modulators). In principle, any MHS/DCS system based on a comb- or a comb-like-source can be improved in terms of SNR, spectral coverage, and averaging capability as long as the source provides a high degree of mutual coherence between the optical modes. Importantly, CAS implemented as an algorithm is compatible with a DC-centered multi-heterodyne spectrum, where the negative frequencies are folded to the positive domain by positioning the center RF beat note nearest to DC, in order to double the number of beat notes within the detector bandwidth.

CAS and DPLL significantly narrow the bandwidth occupied by the DCS/MHS beat notes, which enables efficient noise suppression in amplitude and phase information retrieval for DCS/MHS. This may permit currently existing systems based on DCS/MHS to perform more sensitive absorption and dispersion measurements.

With the recent developments in chip-scale frequency combs based on electrically-pumped semiconductor sources such as quantum cascade lasers (QCLs) or inter-band cascade lasers (ICLs), the primarily bulky DCS setup has reached the potential of being considerably miniaturized for battery-operated portable spectrometers with unprecedentedly small footprints.

Unfortunately, this convenience comes at a high price. Free-running semiconductor combs fluctuate in repetition rate on the order of hundreds of hertz, which rationed to the typical repetition rate of several gigahertz, corresponds to relative stability of $10^{-7}$. This is still several orders of magnitude worse than that of fiber-based combs. In addition to repetition rate, common offset frequency, referred to as carrier-envelope offset (CEO) frequency, fluctuates as well scaled by approximately the order of the mode being roughly equal to the ratio of the emission spectrum center to the laser free spectral range. Both kinds of instabilities are illustrated schematically in FIG. 1.

Figure 2A:
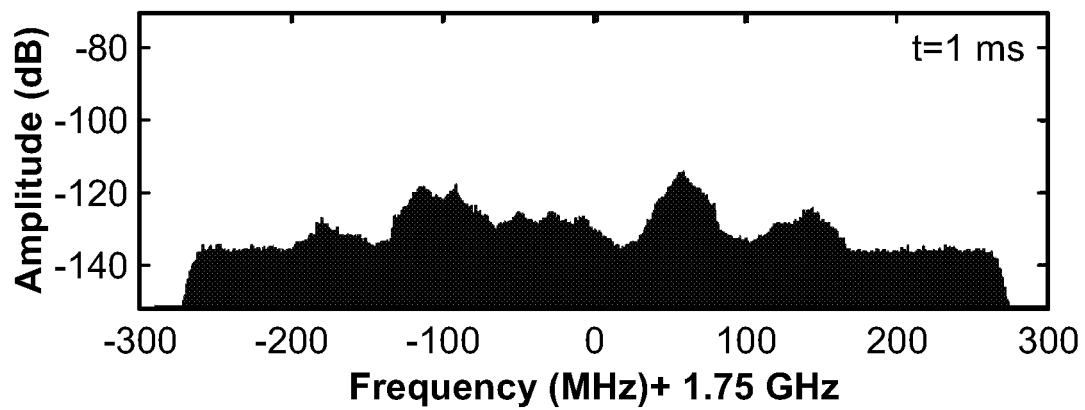
FIG. 2A is a graph demonstrating correction capabilities according to an embodiment of the present invention.

In simple terms, even though such combs show high mode-to-mode coherence, they seem to be corrupted by considerable amounts of phase noise. When a pair of such free-running combs is optically beaten on a photodetector in a DCS/MHS configuration, the result will be disappointing. Instead of observing numerous down-converted narrow RF comb lines, one will experience a featureless spectrum because the beat notes will be dispersed over a large range of frequencies, which tend to completely overlap in extreme cases, as plotted in the graph in FIG. 2A.

Figure 2B:
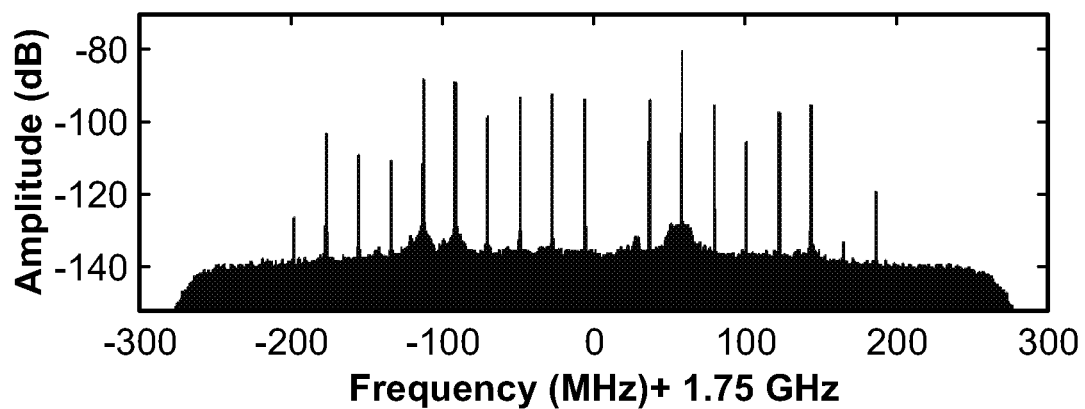
FIG. 2B is a graph demonstrating correction capabilities according to an embodiment of the present invention.

A well-known fact about the Fourier Transform states that it is not suitable for non-stationary signals, i.e. such that change their statistics over time. Beat notes that change their position on the frequency axis (often much more than the spacing between the lines) are undoubtedly an extreme example of non-stationarity. To make matters even worse, each RF multi-heterodyne line shows a different frequency deviation and hence different amount of phase noise. A question that naturally arises is whether such fluctuating sources are useful in any practical applications. The answer is positive thanks to the conception of a relatively new discipline of laser spectroscopy: computational MHS employing advanced signal processing tools to deal with imperfections of real-world frequency combs. Simply speaking, the beating interferogram carries information about the instantaneously swept optical spectrum. It just needs to be processed in a more advanced way. The results of the phase and timing correction routine disclosed herein are plotted in the graph in FIG. 2B.

Another way to account for the non-synchronized operation of the combs is to employ electronic feedback loops. Unfortunately, the main limitation of a hardware frequency or phase locked loop is its finite bandwidth. Both solutions have been successfully employed for inter-locking two comb-like QCLs, yet the narrowing of the beat notes' line width was severely limited by the response time of the control loop. When deployed in DCS/MHS setups with a hundred lines or more, they revealed their major disadvantage: the stabilization of the CEO frequency difference does not account for a gradual broadening of the beat notes lying far away from the locked beat note caused by varying repetition rates of the combs. Finally, not only are such hardware loops costly, but also bulky and difficult to tune for long-term stable operation.

A natural remedy comes with the help of digital signal processing tools. For instance, contemporary wireless networks employ sophisticated carrier recovery algorithms to combat phase noise causing a rotational spreading of points on the constellation diagram. To deal with similar issues caused by excessive amounts of phase noise spreading the power of the multi-heterodyne beat notes over a large bandwidth, disclosed herein is a digital phase-locked loop (DPLL) algorithm with an architecture optimized for real-time processing platforms like FPGA.

Prior to the era of all-computational DCS/MHS solutions, researchers dealt with comb instabilities using adaptive sampling techniques combined with external CW reference lasers, additional beam splitters, and photodetectors. While such are easily available in the near-infrared, at longer wavelengths (mid- to far-infrared), both lasers and detectors are predominantly custom-made, expensive, and often large in size. In particular in the terahertz regime these difficulties severely hinder the application of this idea, because the highest performance fast photodetectors are liquid-helium-cooled superconducting bolometers. The disclosed approach accepts that a computationally-corrected measurement without a CW reference laser produces an equidistant RF spectrum with an arbitrary frequency axis, however it enables eliminating additional optical elements in the setup. Typical megahertz fluctuations of free-running sources are incomparably small to the line widths of gaseous or solid absorbers at atmospheric pressure, thus can be neglected even for high resolution atmospheric sensing applications.

One approach that presented a demonstration of a purely computational correction of multi-heterodyne signals relied on the Extended Kalman Filter (EKF), which reconstructed the amplitudes, phases, and frequencies of all lines in multi-heterodyne signals in the time domain. While being effective, the computational complexity of the EKF caused predominantly by an inversion of a large matrix required at each step with the arrival of a new sample may hinder its application in DCS/MHS systems with more than a few dozens of lines.

Another approach proposed involves the use of the cross-ambiguity function developed initially for radar applications. Conceptually, it is similar to the well-known cross-correlation technique capable of retrieving the time delay between consecutive burst of the interferogram and hence the repetition rate, yet additionally it can reveal the frequency offset between two similar waveforms. This approach demonstrated an impressive correction of approximately 3000 comb teeth initially dispersed in the RF domain due to CEO and repetition rate fluctuations. Unfortunately, the algorithm requires generation of a two-dimensional map with multiple points for each burst of the interferogram, and search for the global maximum at each step, hence can be perceived as quite computationally-demanding. Also, its application will be hindered in QCL or ICL based spectrometers wherein no identifiable zero path difference bursts appear in the beating signal, which is required for comparative purposes by the cross-ambiguity function.

The aforementioned approaches provide both timing and offset correction. In some applications, a straightforward alignment of multiple short-time multiheterodyne magnitude spectra or equivalently time-domain interferogram bursts for offset correction may be sufficient. Nevertheless, there are some disadvantages of this approach: the linewidth of the beat notes is limited by the acquisition time of a single frame, the alignment is accurate to the grid of the Fourier Transform, and the lack of repetition rate correction does not account for the cumulative broadening of the beat notes lying at the edges of the spectrum. More importantly, it allows to use beat notes identifiable only within a single-frame acquisition. Simply speaking, weaker beat notes cannot be used for spectroscopic assessments, thus limiting the useable bandwidth. The disclosed approach mitigates most of these limitations, while being dramatically less complex.

Figure 3:
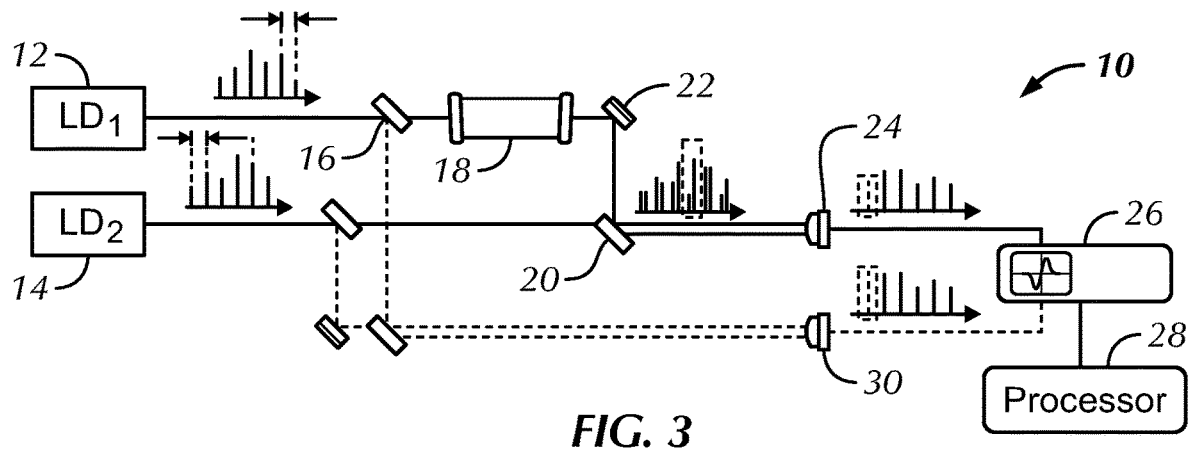
FIG. 3 is a schematic diagram of a dual-comb (multiheterodyne) spectroscopy system according to an embodiment of the present invention.

A dual-comb configuration example is illustrated in FIG. 3. In this nonlimiting configuration, the system 10 includes two laser light sources 12, 14. The first laser light source 12 generates a first light beam having a first optical path and is directed toward a first beam splitter/combiner 16 that creates two light beams, one directed toward a sample 18 and the other direct toward a second beam splitter/combiner 20. The sample 18 can be a liquid, gaseous, or solid form substance. This results in a pre-sample first laser light beam and a post sample first laser light beam. The second laser light source 14 generates a second light beam having a second optical path and is directed toward the second beam splitter/combiner 20 that generates another two light beams. The first light beam of the second laser light source 14 is combined with the pre-sample first laser light beam and the second light beam of the second laser light source 14 is combined with the post sample first laser light beam via a combination of optical hardware 22 such as beam splitter/combiners and/or mirrors. This results in two light beams: a pre-sample combined light beam and a post sample combined light beam that are directed to one or more photodetectors 24. The outputs of the photodetectors 24 are converted to digital via an acquisition card 26 for subsequent digital processing via a digital signal processor 28. The dashed lines in FIG. 3 illustrate the optical path for an optional reference detector 30.

Figure 4:
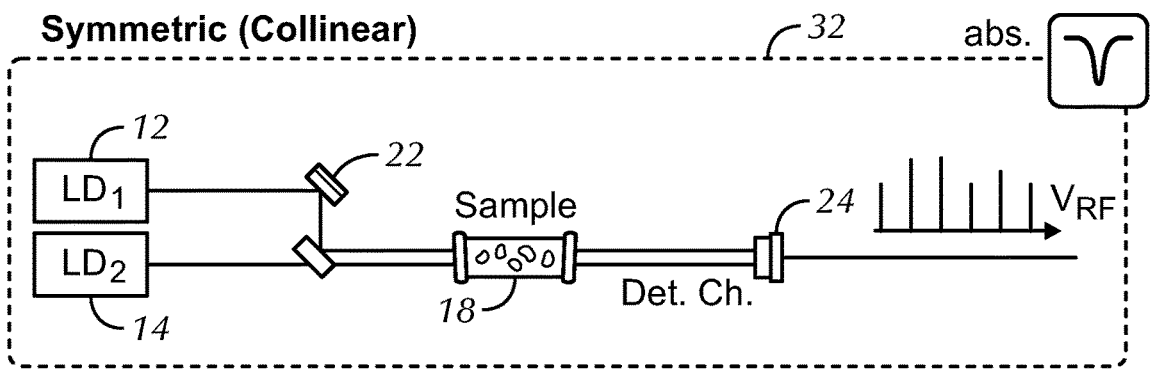
FIG. 4 is a schematic diagram of a symmetric dual-comb (multiheterodyne) spectroscopy system according to an embodiment of the present invention.

Alternative dual-comb configuration examples are illustrated in FIGS. 4-7. FIG. 4 shows a symmetric (collinear) configuration 32. The light from the first and second lasers 12, 14 are combined via a combination of optical hardware 22 such as beam splitter/combiners and/or mirrors before interaction with the sample 18. The combined light beams transmitted through the sample (post-sample beams) are directed to a photodetector 24.

Figure 5:
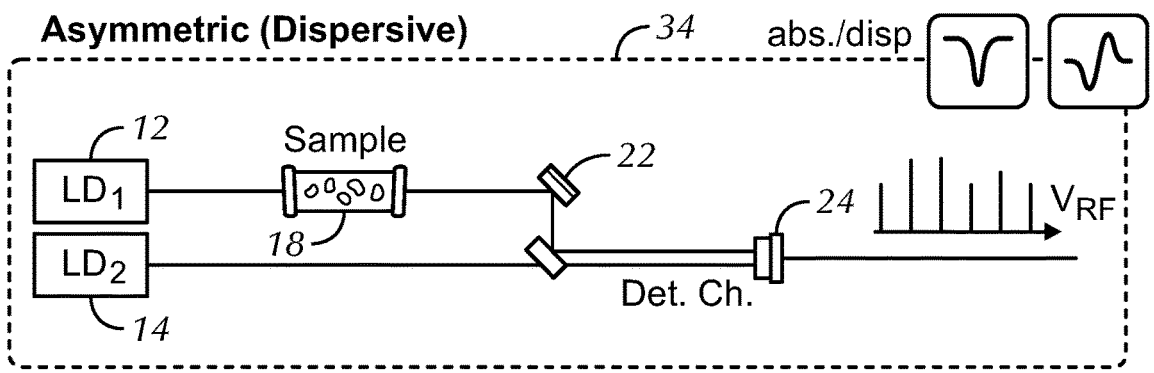
FIG. 5 is a schematic diagram of an asymmetric dual-comb (multiheterodyne) spectroscopy system according to an embodiment of the present invention.

FIG. 5 illustrates an asymmetric (dispersive) configuration 34. The light from the first laser 12 is directed through the sample 18 (a post-sample beam). The light from the second laser 14 does not interact with the sample 18 (a pre-sample beam) and is directed to optical hardware 22 where it is combined with the first laser post-sample beam. The combined light beams are directed to a photodetector 24.

Figure 6:
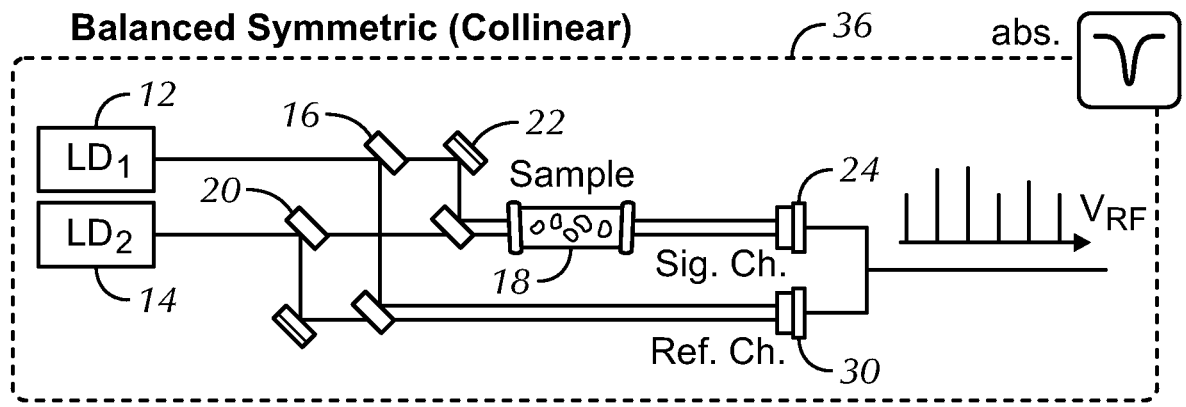
FIG. 6 is a schematic diagram of a balanced symmetric dual-comb (multiheterodyne) spectroscopy system according to an embodiment of the present invention.

FIG. 6 illustrates a balanced symmetric (collinear) configuration 36. The first laser light 12 is directed toward a first beam splitter/combiner 16 that creates two light beams. The second laser light source 14 is directed toward the second beam splitter/combiner 20 that generates another two light beams. The first light beams of the first and the second laser light sources 12, 14 are combined and directed through the sample 18 (combined post-sample beams) to the photodetector 24 via a combination of optical hardware 22 such as beam splitter/combiners and/or mirrors. The second light beams of the first and the second laser light sources 12, 14 are combined and directed to the second photodetector 30 without prior interaction with the sample 18 (pre-sample beams).

Figure 7:
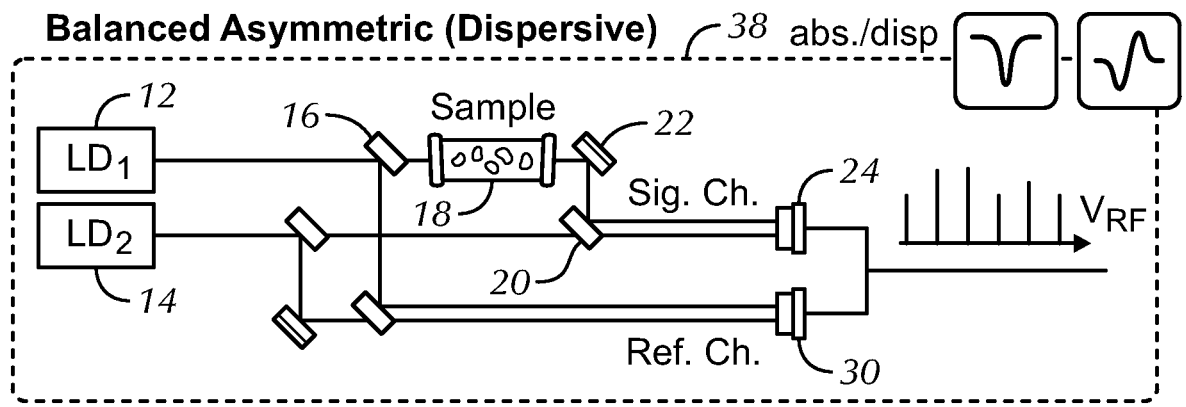
FIG. 7 is a schematic diagram of a balanced asymmetric dual-comb (multiheterodyne) spectroscopy system according to an embodiment of the present invention.

FIG. 7 illustrates a balanced asymmetric (dispersive) configuration 38. The first laser light 12 is directed toward a first beam splitter/combiner 16 that creates two light beams. The first light beam of the first laser 12 is directed through the sample 18 (post-sample beam). The second laser light source is directed toward the second beam splitter/combiner 20 that generates another two light beams. The first light beam of the second laser light source 14 is combined with the first light beam of the first laser 12 that interacted with the sample 18 (post-sample beam) and the combined laser beams are directed onto the photodetector 24 via a combination of optical hardware 22 such as beam splitter/combiners and/or mirrors. The second light beams of the first and the second laser light sources 12, 14 are combined and directed to the second photodetector 30 without any interaction with the sample 18 (pre-sample beams).

Figure 8:
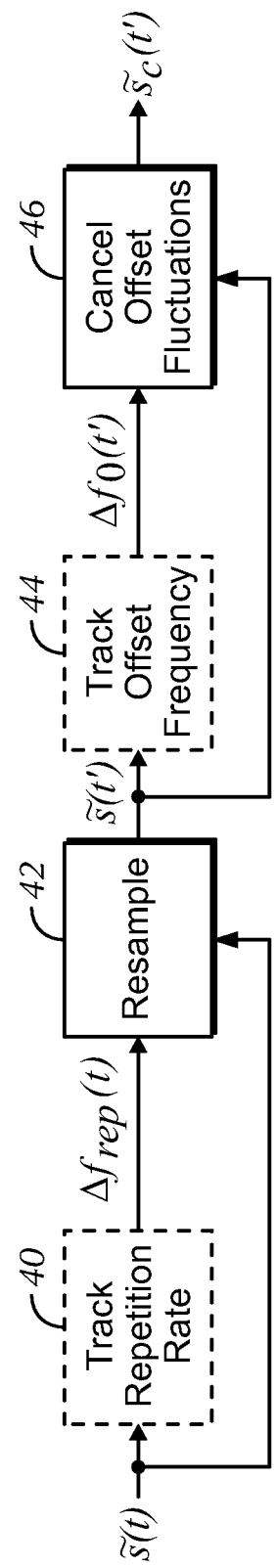
FIG. 8 is a flow chart of proposed timing and phase correction according to an embodiment of the present invention.

At the core of the disclosed invention lies the observation that once the mode-number-dependent phase noise contribution of the fluctuating combs' repetition rates is removed, correcting for common phase noise is only needed. Therefore, it is sufficient to resample the signal to compensate for a variable duration of the consecutive beating interferograms, followed by a global tracking and correction of the offset. A flow chart of this is shown in FIG. 8. The track repetition block 40 represents the repetition tracking procedure, which can be performed by using a direct measurement (as shown and discussed later in FIG. 10) or digital domain signal analysis. The retrieved signal is input to the resampling block 42, which represents the timing correction procedure. The resampled signal is input to the frequency tracking block 44, which tracks one or more frequency components of the signal. The output from the frequency tracker is used to apply a phase shift to the signal in the cancel offset fluctuations block 46. The final output is the fully phase-corrected DCS/MHS signal.

The CAS Methodology

CAS is based on digital filtering, mixing, and linear resampling, characterized by low complexity, feasibility of a pure hardware on-line implementation, and no need for a priori knowledge about the instability characteristics. Importantly, information about the instantaneous frequency fluctuations is derived solely from two beat notes in the RF spectrum, as shown in the schematic in FIG. 9.

Figure 9:
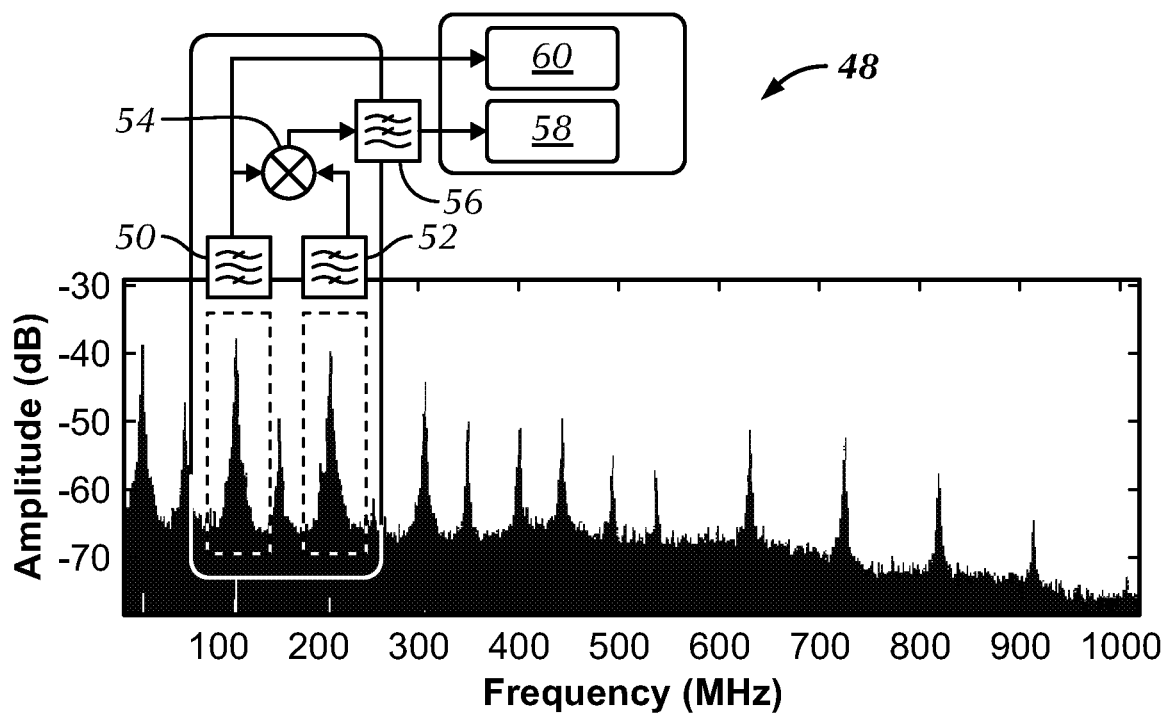
FIG. 9 is a schematic of a computational correction procedure in a radio frequency domain according to an embodiment of the present invention.

FIG. 9 is a schematic of the proposed computational correction system 48 in the radio frequency domain. The system 48 includes two RF band-pass filters 50, 52 and a frequency mixer 54. The system 48 also includes a low-pass filter 56, a phase shifter 58, and an adaptive resampler 60. The RF band-pass filters 50, 52 filter out two frequency components of the DCS/MHS signal that are mixed using the frequency mixer 54. The output from the frequency mixer 54 is low-pass filtered using filter 56 and used as an input to the adaptive resampler 58. The output from the adaptive resampler 58 is used as an input to the phase shifter 60, whose phase shift is adjusted according to the signal from either one of the RF band-pass filters 50, 52. This system 48 can be included in the digital signal processor 28 shown in FIG. 3.

Figure 10:
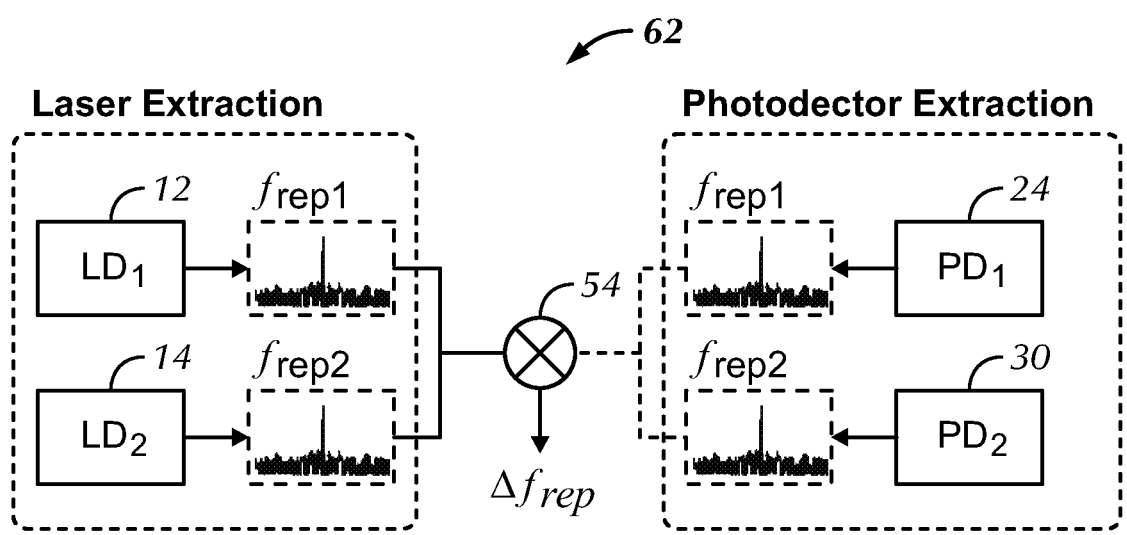
FIG. 10 is a schematic of an alternative extraction/measurement of the repetition rate directly from the laser source and/or photodetector according to an embodiment of the present invention.

FIG. 10 is a schematic diagram of an analog version of the correction system 62. Here, the repetition rate is extracted/measured directly from the laser sources 12, 14 and/or photodetectors 24, 30. The analog RF band-pass filters 50, 52 filter out frequency components that are mixed using an analog frequency mixer 54. The output from the analog frequency mixer 54 is low-pass filtered using the low-pass filter 56 and used as an input to the adaptive resampler 58. The output from the adaptive resampler 58 is used as an input to the phase shifter 60, whose phase shift is adjusted according to the signal from either one of the analog RF band-pass filters 50, 52.

The CAS methodology can be seen both as a phase-correcting adaptive sampling technique, and a coherent averaging technique. It equalizes the duration of the interferogram frames by linear resampling and corrects for the common-mode phase noise with a phase shifter, as illustrated schematically in FIG. 9. This enables efficient concentration of the beat note energy into a single frequency bin.

Since the multiheterodyne RF beat notes may suffer from large frequency offset fluctuations, which broaden the beat notes significantly up to widths in the MHz range (tens of MHz for the phase noise pedestal), the spacing between the beat notes in the RF domain needs to be sufficient to meet the resolvable frequency components criterion. In order to fully utilize the bandwidth of the photodetectors, a spectral folding scheme can be employed. This aliases the beat notes such that they remain uniformly spaced, which is commonly accomplished by DC-centering the RF beat notes and tuning the lowest-frequency beat note to a frequency corresponding to a quarter of the free spectral range difference (AFSR or repetition rate difference $\Delta f_{rep}$). Preferably, the RF beat notes should be frequency locked to this position, which greatly enhances the long-term stability of the digital correction algorithm. The spectral folding procedure is not a necessary condition for the CAS methodology to operate but allows for a doubling of the number of usable beat notes within the detection bandwidth, at the expense of slightly complicating the signal processing.

The following steps demonstrate the CAS methodology applied to noisy MHS data obtained with free-running Fabry-Perot interband cascade lasers (FP-ICLs), but it can be employed for the correction of any coherent sources for spectroscopy in the dual-comb configuration.

Correction of Timing and Offset Fluctuations

To correct for timing and offset fluctuations of the noisy multimode sources, the CAS algorithm assumes a frequency comb model. The instantaneous frequency of the $n^{th}$ comb line can be expressed as $$f_n = f_0 + n f_{rep} \quad (1)$$

where n is a large integer, $f_{rep}$ is the mode spacing, and $f_0$ is the carrier-envelope offset (CEO) frequency. As a result of the optical beating between the two laser sources 12, 14, the optical spectrum is down-converted to the RF domain, producing a comb of frequencies spaced by $\Delta f_{rep} = |f_{rep1} - f_{rep2}|$, which is the difference in the free spectral ranges ($f_{rep1}$ and $f_{rep2}$) of the two laser sources 12, 14 used in the system. Therefore, the instantaneous RF frequency of the $n^{th}$ beat note can be expressed as:

$$f_{n,rf} = f_{off} + n \Delta f_{rep}. \quad (2)$$

In the RF domain, all the beat notes are shifted equally in frequency by the difference in CEO frequencies of the individual lasers $f_{off} = |f_{0,1} - f_{0,2}|$, whereas the fluctuations of the particular beat note frequency due variations in $\Delta f_{rep}$ are dependent on the beat note number n. This effectively causes variations in the length of the beating signal (interferogram) and requires correction of the time axis to enable coherent averaging of the spectra.

Figure 11:
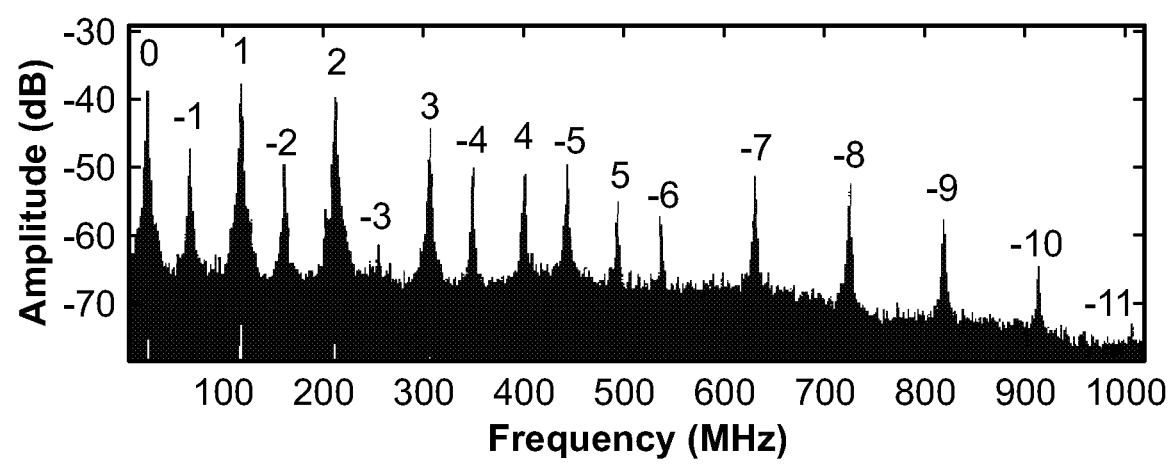
FIG. 11 is a graph of a folded radio frequency spectrum according to an embodiment of the present invention.

The bandwidth-maximizing spectral folding scheme, as illustrated in FIG. 11, introduces an additional complexity since any frequency fluctuations in the folded frequency components exhibit the reversed frequency dependence compared to the non-folded ones. This originates from the non-negative frequency representation (folding), i.e., $$f_{n,rf} = |f_{off} + n \Delta f_{rep}|, \quad (3)$$

where $n = (\ldots, -2, -1, 0, 1, 2, \ldots)$, and the negative signs correspond to the folded frequency components.

Consequently, the phase fluctuations of the folded and non-folded beat notes have opposite phase and need to be corrected separately. The correction procedure is performed in two stages: first the repetition rate fluctuations are corrected, which removes the dependence on n, after which the offset frequency fluctuation correction can be performed using any beat note. In the proposed phase and timing correction scheme, instead of utilizing the time-domain signal resulting from a superposition of all modes, the correction signals are extracted by digital mixing and filtering applied to the two beat notes with the highest signal-to-noise ratio.

Timing Correction

The repetition frequency correction is performed by timing correction. The general principle of this process could be compared to an analog magnetic tape, containing a recording of an amplitude-modulated single frequency carrier tone. If, due to aging, the tape material has been locally stretched or compressed, the frequency of the physically recoverable carrier tone will be affected. To correct for these fluctuations during the recovery of the original amplitude message, one needs to play the tape at a variable rate, which assures constant carrier frequency. If an average frequency is assumed or known a priori, or is assumed to be the average of that on the tape, one can play the recording at a rate r given by:

$$r(t) = \frac{\langle f_{rep} \rangle}{f_{rep}(t)}, \quad (4)$$

where $f_{rep}$ denotes the instantaneous repetition frequency, and $\langle f_{rep} \rangle$ is its expected value. Similar correction can be applied to correct for fluctuations in $\Delta f_{rep}$, where the variable rate r is analogous a nonlinear time axis t', where the time flow is perturbed according to:

$$t'(t) = \int_0^t \frac{\langle f_{rep} \rangle}{f_{rep}(\tau)} d\tau. \quad (5)$$

Such a formulation has a straightforward application in the discrete data case, where the signal is sampled at a constant time interval T, which requires resampling at new time points given by t', $$t'(nT) = T \cdot \sum_{k=1}^{n} \frac{\langle f_{rep} \rangle}{f_{rep}(kT)}. \quad (6)$$

This adaptive sampling scheme can be realized on-line by triggering the multiheterodyne signal acquisition at $\Delta f_{rep}$, or by linear resampling in post-processing. The latter method is preferable to eliminate the need for any additional optical or electronic elements in the spectroscopic system.

To extract the repetition frequency fluctuations $\Delta f_{rep}$ in a computational manner, a peak detection procedure is implemented to determine the center frequencies of the two dominant RF beat notes (spaced by the mean value of $\Delta f_{rep}$). This is followed by bandpass filtering via the RF band-pass filters 34, 36 at the extracted center frequencies. In one example, filter bandwidth is set to 80% of $\Delta f_{rep}/2$, ~37.6 MHz via a digital high-order zero-phase Butterworth IIR filter that processes the signal in both the forward and reverse direction. This ensures a linear phase response of the recursive filter and removes unwanted time-shifts introduced by the filter. The IIR structure makes it possible to lower the filter order compared to a conventional FIR structure with the same stopband attenuation. In addition, it minimizes the computational cost of the filtering procedure, albeit at the expense of edge effects that can be suppressed by appropriate padding of the signal. The filtered beat note signals are mixed via the frequency mixer 38 by squaring the amplitude versus time signal and passing the differential frequency component only. Finally, a Hilbert transform is applied to the mixed time-domain signal to create its complex representation for the instantaneous phase retrieval. The instantaneous repetition frequency is calculated from the instantaneous phase by a Savitzky-Golay derivative, whose filter order is adjusted so that it rejects numerical artifacts caused by differentiation without over-smoothing the estimate.

Figure 12A:
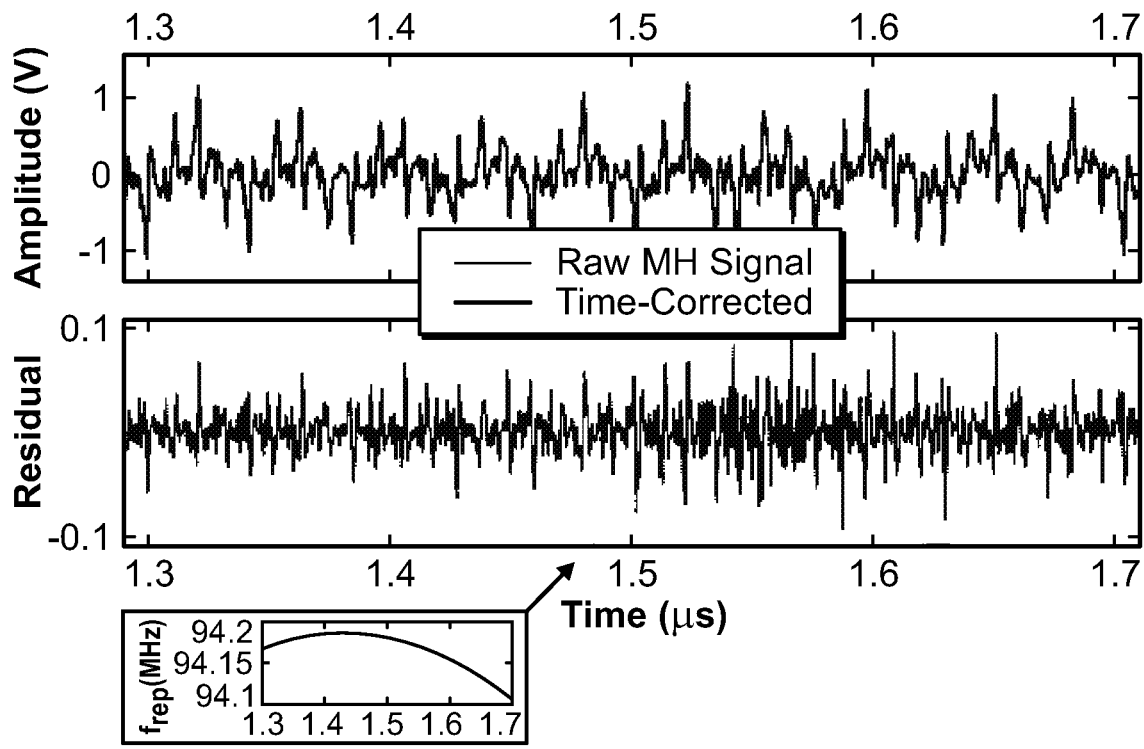
FIG. 12A is a graph of an interferogram before and after timing correction according to an embodiment of the present invention.
Figure 12B:
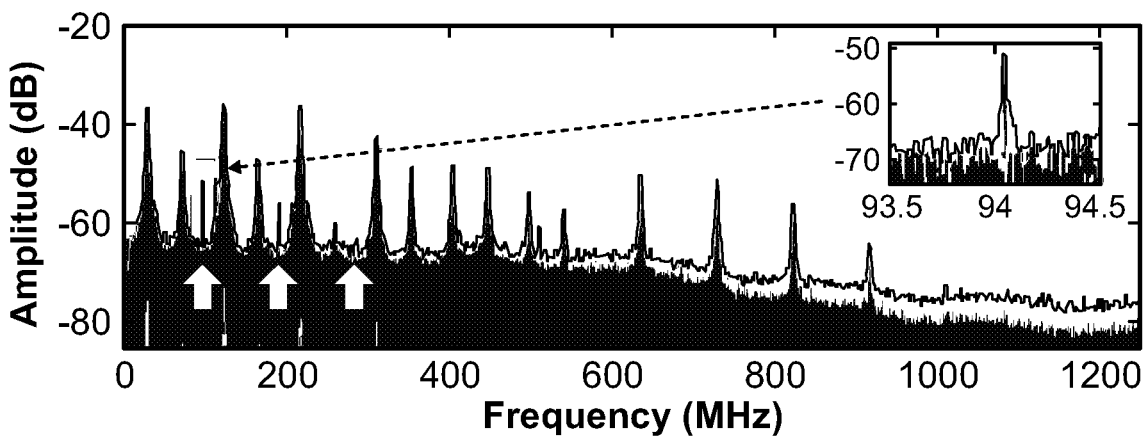
FIG. 12B is a graph of timing correction of an interferogram in the spectral domain according to an embodiment of the present invention.

FIGS. 12A and 12B show the influence of the timing correction on the interferogram signal and its RF spectrum. FIG. 12A is a zoom of the interferogram before and after the timing correction. The repetition rate in the presented time window is slightly greater than the mean 94.04 MHz, therefore the resampling procedure stretches the signal in time. The difference between the original and resampled signal is shown in the residual plot, where the cumulative effect of a locally increased speed causes an increasing difference between the two channels. This gradually decreases as the repetition frequency tends towards the mean. For FIG. 12B, in the spectral domain, the detector signal possesses clear harmonics of the repetition frequency as a result of self-mixing of the RF beat notes. For visibility, the self-mixing beat notes are marked with arrows together with an inset showing the narrowing of the self-mixing beat note. This is an indication that the beat notes jitter coherently and only the offset frequency fluctuations remain to be corrected.

Due to residual nonlinearities in the RF signal path, the high phase correlation of the multiheterodyne beat notes results in a detectable self-mixing signal at $\Delta f_{rep}$. These harmonics arise due to residual nonlinearities in the RF signal path and high phase correlation of the multiheterodyne beat notes. After the timing correction, the self-mixing signal is clearly amplified and narrowed down to widths ultimately limited by the acquisition time, which also results in enhancement of its higher harmonics that were barely visible before the correction, as illustrated by the inset in FIG. 12B.

To further improve the performance of the timing correction, the dominant mode pair spacing criterion can be extended to multiples of $\Delta f_{rep}$. This also allows for the use of non-neighboring RF beat notes since the high SNR beat notes may lie in different parts of the spectrum. However, in most cases the neighboring RF beat notes are of comparable amplitude, making the simplified single $\Delta f_{rep}$ spacing case sufficient. Alternatively, one can self-mix the broadband non-filtered signal (by feeding it to a non-linear element), which yields narrow harmonics of the repetition frequency that carry information about the timing fluctuations extracted from beating between all the RF beat notes. By tracking the instantaneous frequency of the first harmonic (fundamental frequency), one can retrieve the correction signal for resampling. The latter procedure can find application to systems based on sources with severe phase noise. In such cases, this procedure can compensate fluctuations of $\Delta f_{rep}$, leaving only one variable, the offset frequency fluctuations that are common for all the beat notes, which is estimated using multi-frequency tracking algorithms and applied as a correction.

Spectral Unfolding

If the multiheterodyne system uses the spectral folding technique, spectral unfolding is required in order to correct the phases of both folded and non-folded beat notes in a single step. If the RF beat notes are loosely frequency stabilized, the beat note spacing and individual frequencies are well-defined, which simplifies the unfolding procedure (first beat note frequency and the repetition rate define all frequencies in the spectrum).

Figure 13A:
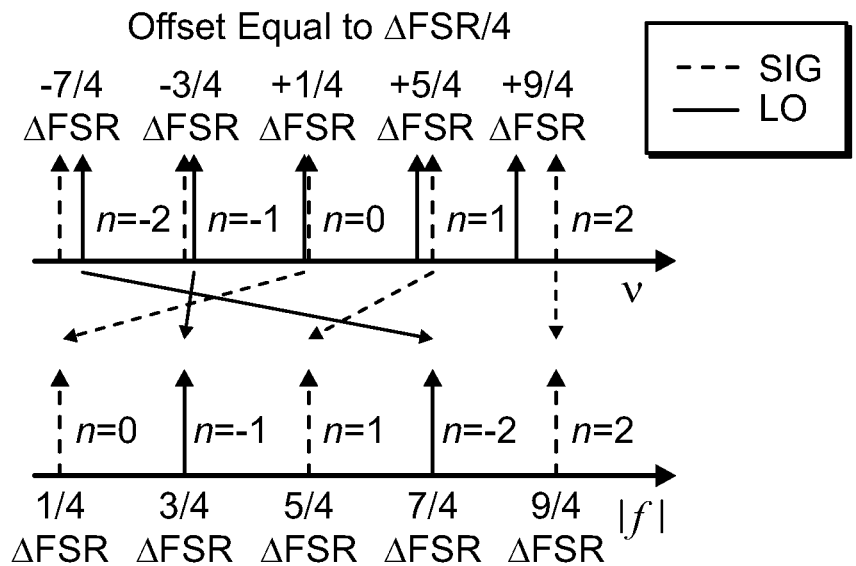
FIG. 13A is a graph illustrating ambiguity of the radio frequency optical domain mapping order in the spectral folding scheme according to an embodiment of the present invention.
Figure 13B:
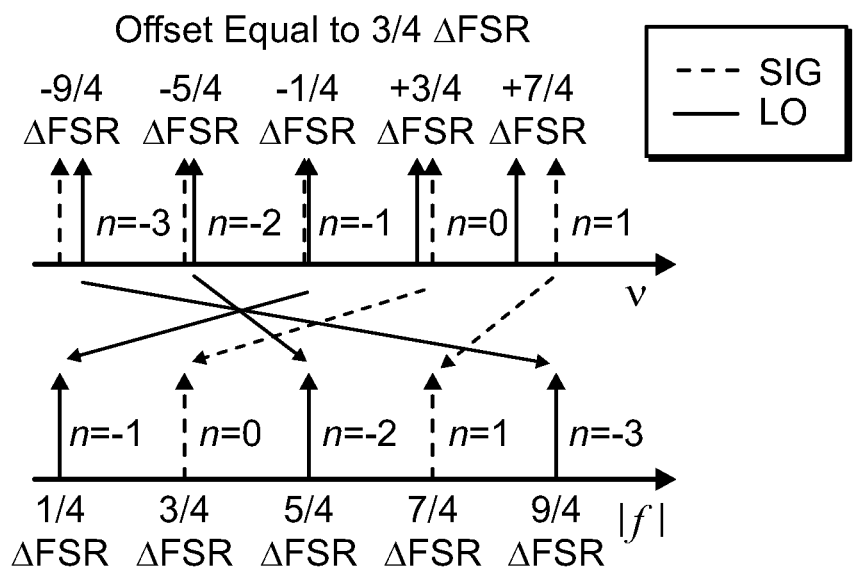
FIG. 13B is a graph further illustrating ambiguity of the radio frequency optical domain mapping order in the spectral folding scheme according to an embodiment of the present invention.

There are two possible configurations of the folded multiheterodyne RF spectrum, which differ in the order the beat notes map the optical domain to the RF domain. Subsequently, these configurations determine which direction the beat notes move when the offset frequency is changed, as shown in FIGS. 13A and 13B. The most widely used convention places the optical comb interacting with the sample (whose mode spacing is greater than that of the local oscillator (LO)) so that the optical frequency of the mode that produces the lowest frequency beat note is located at $\Delta FSR/4$ higher in frequency relative to the LO. This is illustrated by FIG. 13A.

Thereby the optical domain is mapped to the RF domain from low to high frequency, i.e., the optical modes are numbered from negative to positive in the order they appear in the spectrum. In this configuration the frequency fluctuations of the lowest frequency beat note can essentially be interpreted as the offset frequency fluctuation $f_{off}$, and all the RF beat notes spaced by $\Delta f_{rep}$ will map the positive-numbered optical modes in a non-mirrored fashion and all negative-numbered optical modes will be folded and offset by $\Delta FSR/2$. However, one can easily obtain the opposite situation, as shown by FIG. 13B, where the lowest frequency beat note is generated by heterodyne beating of an optical mode that is lower in frequency than the corresponding LO mode. The resulting frequency of the lowest-frequency RF beat note will thus be negative, but due to the spectral folding the beat note will appear at positive frequency. Consequently, the RF beat notes spaced by $\Delta f_{rep}$ will map the negative-numbered optical modes while beat notes from positive-numbered modes will be folded and offset by $\Delta FSR/2$. In this case frequency fluctuations of the lowest-frequency beat note should be interpreted as a negative offset shift $f_{off}$ assuming that the offset frequency is defined modulo the repetition rate and is constrained to be positive.

As a result, the mapping of the RF beat notes to the optical domain, which starts from the lowest frequency beat note, must be done according to the beat note configuration. The ambiguity and change of the mapping direction makes the assessment of the beat notes' sign of large importance to achieve correct optical mode mapping.

One way to distinguish the two cases of folding is to determine in which direction the lowest frequency beat note moves when the injection current of the sample-interacting laser is changed. This information can easily be obtained through a frequency discriminator feedback circuit, where the sign of the control signal will determine whether the lowest-frequency beat note is a result of optical beating lower or higher in frequency compared to the LO. FIG. 11 shows a situation where the lowest frequency beat note is followed by a folded beat note, which is consistent with the established convention.

Having determined the beat note signs followed by selective multi-frequency bandpass filtering, time domain signals can be extracted that contain only the positive, $y_p(t)$, or only the negative beat notes, $y_n(t)$, while the complete measured signal is a superposition of both complementary signals:

$$y(t)=y_p(t)+y_n(t). \quad (7)$$

In order to enable negative frequency representation, the data needs to be transformed into the complex domain. For this reason, the signals $y_p(t)$ and $y_n(t)$ are Hilbert-transformed into analytical form, which preserves only the positive frequencies of their Fourier domains. Finally, to unfold the spectrum a complex conjugate of the negative beat note analytical signal, $\tilde{y}_n^+(t)$, is added to the positive, $$\tilde{y}(t)=\tilde{y}_p(t)+\tilde{y}^*_n(t). \quad (8)$$

Figure 14:
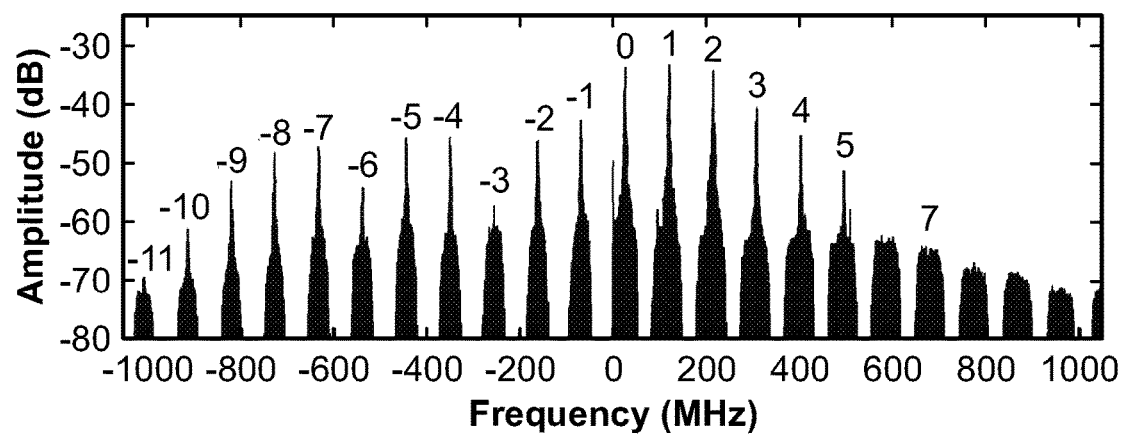
FIG. 14 is a graph of an unfolded radio frequency spectrum according to an embodiment of the present invention.

FIG. 14 shows the DC-centered complex frequency spectrum of $\tilde{y}(t)$, where the gaps between the subsequent beat notes are created via filtering and unfolding process. Notably, if the imaginary component of the signal is ignored, the real part should be identical to the non-processed $y(t)$. This conveniently allows for back-folding of the spectrum after the offset correction is performed, as described in the next subsection.

Frequency Offset Correction

Figure 15:
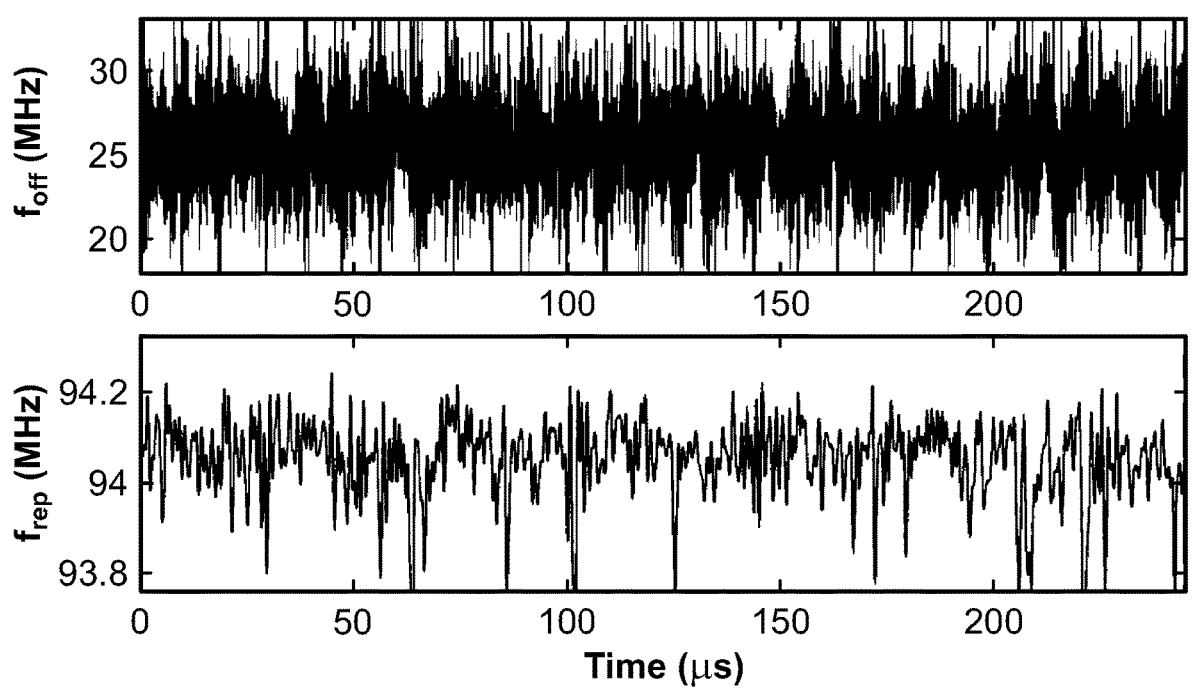
FIG. 15 is a graph of radio frequency offset frequency and radio frequency repetition rate frequency fluctuations according to an embodiment of the present invention.

The final step in the phase and timing correction for the multiheterodyne data is to correct for the offset frequency fluctuations that are common for all modes. After the timing correction, the beat note with the highest SNR and the narrowest line shape is used for the instantaneous phase fluctuation retrieval to suppress the noise contribution perturbing the estimate. The instantaneous phase, $\varphi_{off}$, is derived from the complex representation of the multiheterodyne signal after bandpass filtering with edge-effect suppression through data padding and phase linearization, as described before for the IIR filter. Most importantly, since this correction is performed directly on the instantaneous phase, the instantaneous frequency calculation that may introduce numerical artifacts caused by discrete numerical differentiation, is not needed. For the data in this work (including spectrally interleaved measurements), a bandpass filter bandwidth of 0.84 $\Delta f_{rep}/2$ and a beat note SNR of 10-20 dB were sufficient for the $f_{off}$ retrieval. FIG. 15 plots the retrieved instantaneous offset frequency as well as the instantaneous repetition rate. It is clear that the offset frequency, $f_{off}$, in absolute terms varies by approximately two orders of magnitude more than the repetition frequency, $\Delta f_{rep}$, and is hence the major contributor to the beat note broadening.

Finally, the offset frequency correction is performed by multiplying complex, spectrally-unfolded multiheterodyne signals by a linearly varying phase term corresponding to a constant offset frequency ($\varphi_{off}=f_{off} t$ when $f_{off}$=const.). The constant offset frequency can be assumed based on either the mean value determined as the center position of the beat note used for the correction, the expected value of $f_{off}$ assumed a priori, or determined as a slope of a global linear fit to the instantaneous phase. The linear fit method typically outperforms the other two methods, as it does not make any assumption regarding the frequency of the beat note, which is a source of potential errors. Once the offset frequency fluctuations are extracted from one beat note, they are applied to correct the phase of all multiheterodyne beat notes within the complex multiheterodyne signal. This eliminates the fluctuations of $f_{off}$ and ensures constant beat note frequencies throughout the acquisition. In other words, the retrieved instantaneous phase, $\varphi_{off}$, of the timing-corrected beat note centered at $\langle f_{off} \rangle$ is inserted into the equation $$\tilde{y}_{corr}(t) = \exp\left(-i2\pi \int_0^t f_{off}(\tau) - \langle f_{off}\rangle d\tau\right) \cdot \tilde{y}(t) = \quad (9)$$

$$\exp(-i\varphi_{off}(t) + i2\pi\langle f_{off}\rangle t)\cdot \tilde{y}(t).$$

where the first exponential term represents the phase-correction process.

Figure 16A:
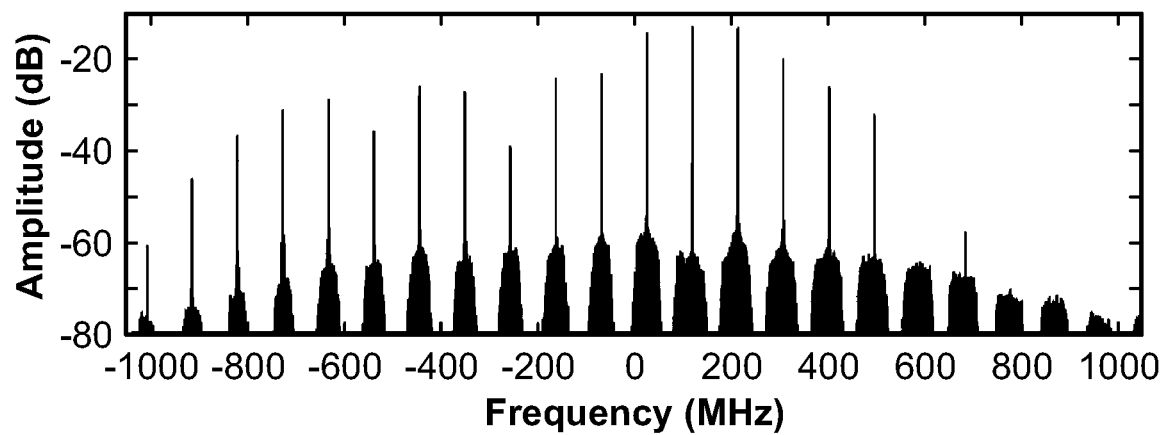
FIG. 16A is a graph of a radio frequency spectrum after computational timing and offset correction according to an embodiment of the present invention.
Figure 16B:
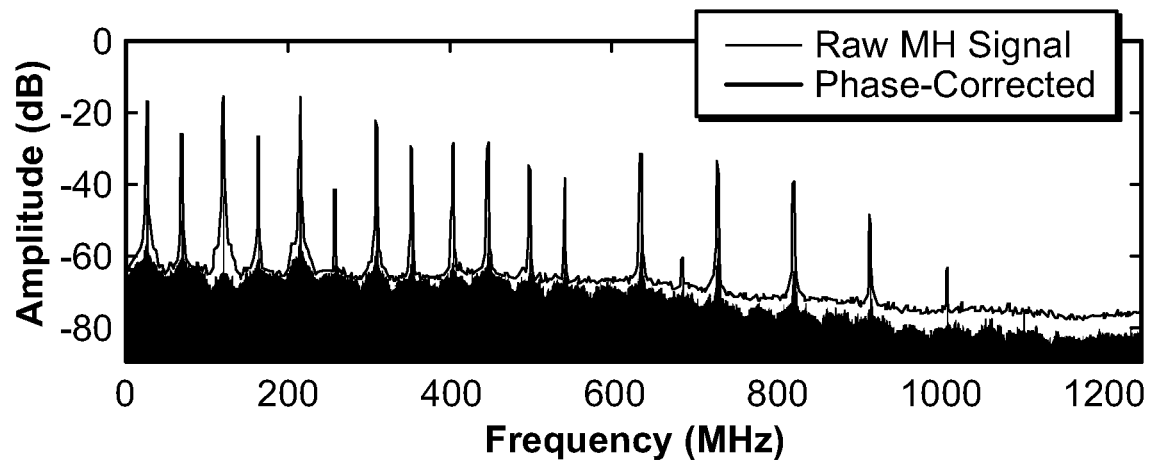
FIG. 16B is a graph further illustrating the radio frequency spectrum after computational timing and offset correction according to an embodiment of the present invention.

As shown in FIGS. 16A and 16B, this procedure leads to a significant linewidth reduction of the multiheterodyne beat notes, in this case fundamentally limited by the total acquisition time (2 kHz corresponding to 500 μs of acquisition time). This is a strong indication that the multiheterodyne beat notes are in fact coherent, albeit with considerable offset frequency jitter. If the opposite were true, a comb-based timing and phase correction procedure such as outlined here would only result in a broadening of the beat notes.

One limitation of the methodology is related to the frequency fluctuations and noise characteristics of the RF beat notes. If the neighboring beat notes strongly overlap, the retrieval of the correction signals will inevitably suffer from cross-talk, leading to a poor correction. To overcome this difficulty, one approach is to separate the adjacent frequency components by increasing the repetition rate of the RF signal and preferably use a large-bandwidth photo-detector. A use of a low-noise amplifier may also be used, as a high signal-to-noise ratio of the RF beat notes enables to estimate the correction signals with better accuracy.

The quality of the correction depends on the coherence properties of the sources used for MHS. If the coherence of neighboring optical modes is weak, the CAS approach may provide minimal improvements in SNR or linewidth.

The DPLL Methodology

The digital phase-locked loop (DPLL) approach does not require the presence of any interferogram bursts or identifiable frames. Instead, it retrieves the instantaneous repetition rate through a simple single-step non-linear operation: the sum of the squared real and complex component, followed by coherent demodulation of any harmonic using an IQ demodulator, which is easily realizable in hardware. This signal can act as an adaptive clock to keep the spacing between the RF comb lines equidistant. Once this is ensured, a simple-formula recursive frequency tracker is employed, which can be implemented in hardware and corrects for global offset phase noise. Consequently, both sources of instabilities are corrected for in the down-converted RF comb. Most importantly, the limitation of a single frame resolution does not pertain here. The line width of the corrected RF comb lines is mainly limited by the acquisition time, provided the sources show sufficient stability at a $1/\Delta f_{rep}$ timescale, and that the extraction of the correction signal is not corrupted by the noise of the photodetector. Another feature of the disclosed approach is that its output is a phase-corrected time-domain signal, which allows to use ordinary RF filters for analyzing data in swept spectroscopy mode. This approach shows almost no degradation of correction efficacy thanks to the use of high-order harmonics of the repetition rate. Finally, even the weakest beat notes can be used for spectroscopy because the entire duration of the beating signal can be harnessed for the calculation of the Fourier Transform.

Figure 17A:
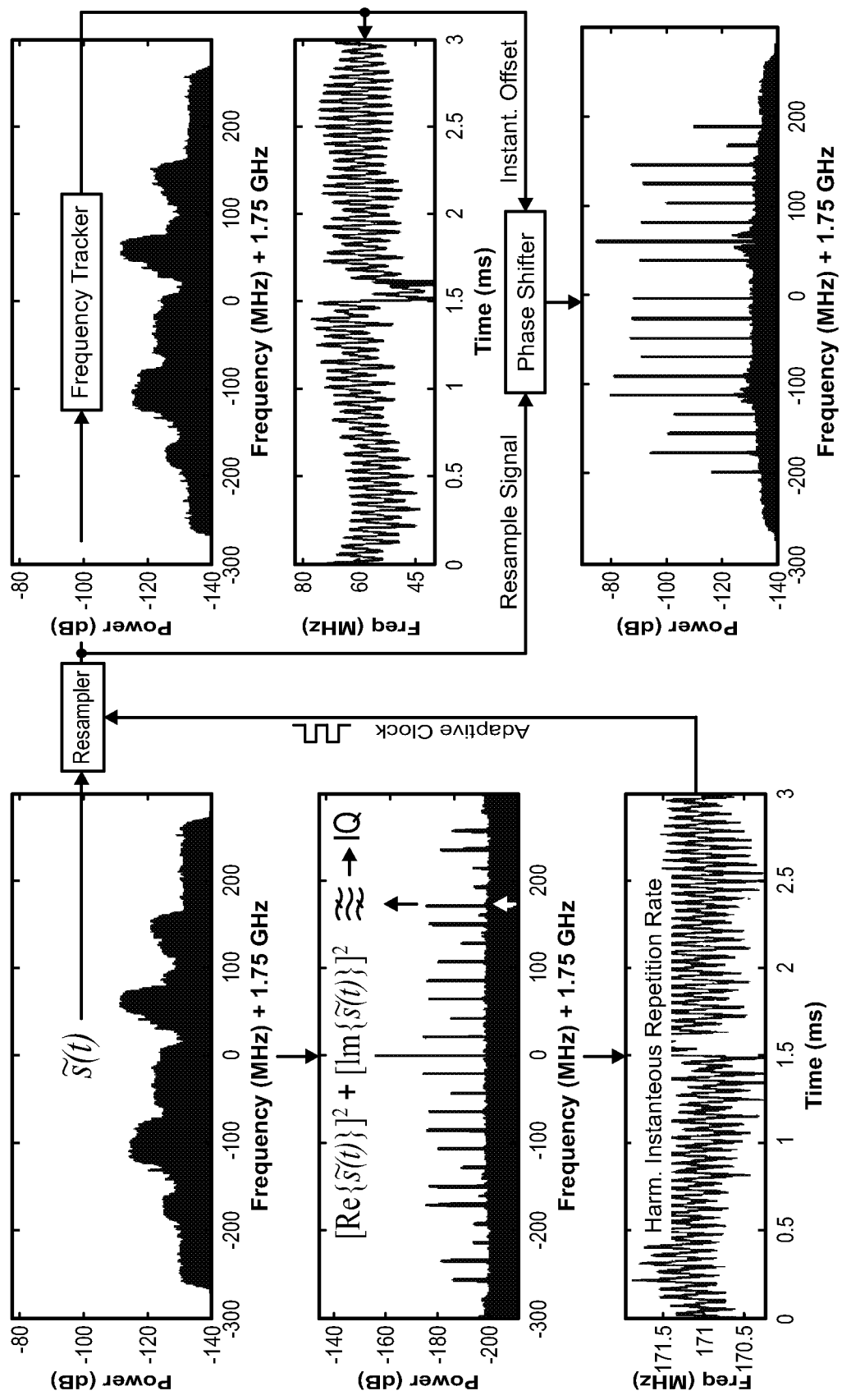
FIG. 17A is a graph of a raw RF spectrum before applying a DPLL correction procedure, a graph showing DDFG signal, a graph of the retrieved instantaneous repetition rate difference, a graph of a resampled DDFG signal, a graph of an RF spectrum after resampling, and a graph of an instantaneous difference offset frequency according to an embodiment of the present invention.
Figure 17B:
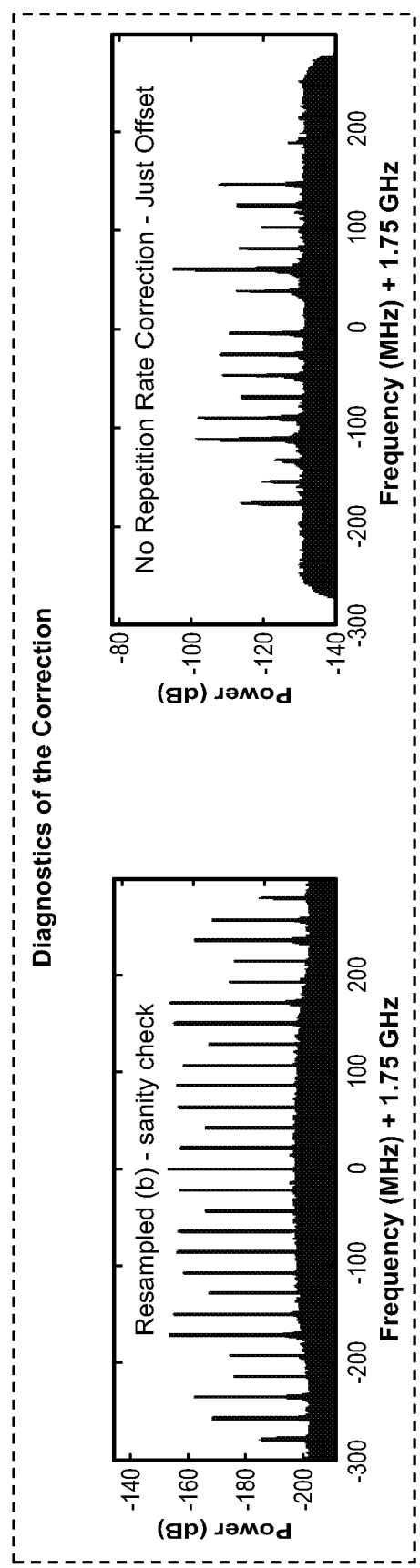
FIG. 17B is a graph of a final corrected RF spectrum after both resampling and phase shifting and a graph of a corrected RF spectrum if only frequency tracking and phase shifting has been applied according to an embodiment of the present invention.

FIGS. 17A-B illustrate the DPLL methodology. FIG. 17A includes a graph of a raw RF spectrum before applying the DPLL correction procedure. FIG. 17A further includes a graph showing the DDFG signal. The arrow in the bottom right corner indicates the harmonic chosen for band-pass filtering followed by IQ-demodulation. Any harmonic can be chosen, but due to the cumulative effect of the difference in repetition rate, a higher harmonic is preferred. FIG. 17A further includes a graph of the retrieved instantaneous repetition rate difference. FIG. 17A further includes a graph of the resampled DDFG signal after the resampling procedure. FIG. 17A further includes a graph of the RF spectrum after the resampling procedure using the spectrum from the graph of the retrieved instantaneous repetition rate difference FIG. 17A further includes a graph of the instantaneous difference offset frequency obtained from the frequency tracker. FIG. 17B includes a graph of the final corrected RF spectrum after both resampling and phase shifting. FIG. 17B further includes a graph of the corrected RF spectrum if only frequency tracking and phase shifting has been applied.

Tracking of the Instantaneous Repetition Rate

For the sake of simplicity, consider a complex multiheterodyne signal $\tilde{s}(t)$ consisting of N unitary amplitude lines with an angular offset frequency $\omega_0$ and an angular repetition rate $\omega_r$, $$\tilde{s}(t) = \exp(i\omega_0)\sum_{n=1}^{N}\exp(in\omega_r t). \tag{10}$$

It can be proven that by combining the squared real and imaginary part, the harmonics of the repetition rate can be extracted without any offset frequency components $$(\text{Re}\{\tilde{s}(t)\})^2 + (\text{Im}\{\tilde{s}(t)\})^2 = \underbrace{N}_{DC} + \underbrace{2\sum_{m=1}^{N}\sum_{l=1}^{m-1}\cos((m-l)\omega_r t)}_{DFG}. \tag{11}$$

This formula, referred here to as the digital difference frequency generation (DDFG), produces a signal being the result of beating between all possible RF comb lines, i.e. a superposition of beating products is obtained between neighboring beat notes, every other, every third etc. Obviously, higher order harmonics of the fluctuating repetition rate will be dispersed in frequency more than the lower ones due to its cumulative broadening effect, increasing linearly with harmonic number.

Once a DDFG signal is obtained, the instantaneous frequency $k\omega_r(t)$ of the highest-order repetition rate harmonic k can be tracked with a sufficiently high signal-to-noise ratio (in practice ~20 dB). The tracking procedure can be obtained through IQ demodulation at the expected value of the repetition rate harmonic within a fixed bandwidth, by employing filtering and the Hilbert transform or more sophisticated harmonic frequency trackers. They enable to deal with overlapping beat notes, which is often encountered in combs with more than a hundred lines with a small repetition rate difference.

The DDFG operation serves additionally as an important diagnostic tool. An RF signal that shows no repetition rate harmonics is non-correctable using the procedure described here because it does not possess comb characteristics.

Correction of the Variable Repetition Rate

Having retrieved the k-th harmonic of the instantaneous RF comb repetition rate $k\Delta f_{rep}(t)$, we need to resample the time-domain data onto a non-uniform grid. The time axis used for resampling has a cumulative character, and is given in the continuous case by $$t'(t) = \int_0^t \frac{k\langle\Delta f_{rep}\rangle}{k\Delta f_{rep}(\tau)}d\tau, \tag{12}$$

where $\langle\Delta f_{rep}\rangle$ denotes the expected value of the repetition rate. The resampling operation aims to ensure an equal duration of the beating events in the interferogram. In this example, the most trivial linear interpolation between sampled two points is used. Note that in the case of semiconductor combs equipped with a microwave bias tee, one can electrically mix the intermode beat notes and feed the difference frequency to the clock signal, thereby avoiding this procedure.

Tracking of the Instantaneous Offset Frequency

After ensuring a constant distance between the lines of the down-converted RF comb, tracking global offset frequency fluctuations is needed. In principle, it is possible to track all lines in the RF spectrum using a modified Multiple Frequency Tracker or the Kalman Filter, but thanks to the repetition rate correction, the complexity of this task can be significantly reduced: it is sufficient to track only one beat note isolated using a band pass filter. A few schemes for this purpose have been identified with different complexity, yet with nearly the same tracking performance. The simplest utilizes a recursion for a real discretely-sampled signal known as the Fast Frequency Tracker, who showed that the formula $$\hat{r}_k = \hat{r}_{k-1} + x_{k-1}\gamma[x_k + x_{k-2} - 2x_{k-1}\hat{r}_{k-1}] \tag{13}$$

can be used to track the instantaneous frequency of a slowly-varying non-stationary sinusoidal signal in sampled in $x_k$. Of course, indices k−1 and k−2 denote values from previous iterations. Notably, $\hat{r}_k$ is an auxiliary signal that contains the tracked frequency in the argument of the cosine $$r_k = \cos(2\pi\Delta f_0(k)T_s), \tag{14}$$

where $T_s = 1/f_s$ is the sampling period. Therefore, to estimate the instantaneous frequency $\Delta f_0$ at k-th iteration, calculating the arccosine of $\hat{r}_k$ scaled by the sampling frequency and $1/2\pi$ is needed $$\Delta\hat{f}_0(k) = \cos^{-1}(\hat{r}_k)\cdot\frac{f_s}{2\pi}. \tag{15}$$

Since the tracking formula $\hat{r}_k$ uses only multiplications and additions, it can undoubtedly be implemented in a real-time platform. Also the arccosine function can be tabulated to facilitate real-time offset frequency tracking.

One of the drawbacks of the Fast Frequency Tracker is a degradation of its performance when $x_k$ is composed of numerous sine waves, which occurs when the drift of the offset frequency exceeds the spacing between the RF lines. Two solutions have been found to effectively solve this problem. The first employs the aforementioned Multiple Frequency Tracker, which is proven to have the lowest tracking delay and be quite robust, at the expense of computational complexity due to its intensive use of matrix inversion. The second is inspired by carrier recovery systems in wireless networks, which comprise a coarse and fine carrier frequency tracker. Whereas the fine tracker is simply the previously discussed Fast Frequency Tracker, coarse estimation enabling to keep the band-pass filter for $x_k$ at a constant frequency is obtained through the Short-time Fourier Transform and cross-correlation detecting the shift in the position of the magnitude spectrum by the same token as in. In short, the problem drifts exceeding the spacing between the RF lines is reduced to tracking residual fluctuations around almost stationary beat notes. The use of the STFT is favored due to its real-time compatibility with modern signal processing platforms.

Correction of the Variable Offset Frequency

The final step in the phase correction is a complex multiplication to counteract the offset frequency fluctuations. The following formula $$\tilde{s}_c(t') = \exp(-j2\pi \int_0^{t'} \Delta f_0(\tau) - \langle \Delta f_0 \rangle \, d\tau) \cdot \tilde{s}(t') \quad (16)$$

multiplies the adaptively-resampled signal by the offset phase fluctuations in counterphase. The $\langle \Delta f_0 \rangle$ term ensures that the corrected spectrum remains at a constant noise-free position, which would be otherwise unnecessarily shifted by the correction procedure.

The disclosed proposed invention can be incorporated into any basic multiheterodyne or dual-comb spectroscopy system. All processing takes place in a computer program or in a real-time processing platform (e.g. an FPGA), enabling noisy but coherent multimode light sources to perform high resolution spectroscopy.

Existing solutions to this problem incorporate additional CW lasers and electronics and thereby introduce further cost and complexity to the systems. The solution outlined in this disclosure circumvents those additional costs.

These techniques are capable of uncovering spectroscopic information that was previously hidden in noise. This ability can potentially lead to an increased number of spectroscopically usable comb teeth, which would increase the spectral coverage of the system.

These techniques are capable of performing coherent averaging over extended time-scales. This ability will increase the sensitivity of the system through averaging.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A multiheterodyne spectroscopy (MHS) or dual-comb spectroscopy (DCS) system including a sample being a liquid, gaseous, or solid form substance, the system comprising:
    a first laser light source and a second laser light source;
    the first laser light source generating a first light beam having a first optical path and being directed toward a first beam splitter/combiner that creates two light beams, one directed toward the sample and the other directed toward a second beam splitter/combiner, resulting in a pre-sample laser light beam and a post-sample laser light beam, respectively;
    the second laser light source generating a second light beam having a second optical path and being directed toward a third beam splitter/combiner that generates a first laser light beam and a second laser light beam;
    the second and third beam splitter/combiners configured to combine the first laser light beam and second light beam from the second laser light source with the pre-sample laser light beam and the post-sample laser light beam, resulting in a pre-sample combined light beam and a post-sample combined light beam;
    a first photodetector configured to detect the pre-sample combined light beam;
    a second photodetector configured to detect the post-sample combined light beam;
    an analog to digital converter coupled to the first photodetector and the second photodetector and configured to generate a digital signal derived from the pre-sample combined light beam and post-sample combined light beam;
    a digital signal processor coupled to the analog to digital converter and configured to receive the digital signal and generate an output signal characterizing the sample, the digital signal processor comprising a computational adaptive sampling (CAS) module configured to perform a timing correction and phase correction on the digital signal;
    the CAS module comprising at least one band pass filter, a frequency mixer, a low pass filter, a phase shifter, and an adaptive resampler.

2. The system of claim 1 wherein the CAS module is further configured to perform spectral folding on the digital signal.

3. The system of claim 1 wherein the CAS module is further configured to perform DC-centering of the beat notes and tuning of the lowest-frequency beat note to a frequency corresponding to a quarter of the free spectral range difference.

4. The system of claim 1 wherein the CAS module is further configured to perform frequency locking of the heat notes to a quarter of the free spectral range difference.

5. The system of claim 1 wherein the CAS module is further configured to perform frequency shifting of all heat notes equally in frequency by the difference in carrier-envelope offset (CEO) frequencies of the first and second laser light sources.

6. The system of claim 1 wherein the CAS module is further configured to separately correct phase fluctuations of folded and non-folded beat notes.

7. The system of claim 6 wherein the CAS module is further configured to correct repetition rate fluctuations and then perform offset frequency fluctuation correction.

8. The system of claim 6 wherein the CAS module is further configured to extract correction signals by digital mixing and apply filtering to two beat notes with the highest signal-to-noise ratio.

9. The system of claim 1 wherein the CAS module is further configured to perform frequency correction by timing correction.

10. The system of claim 1 wherein the CAS module is further configured to perform spectral unfolding to correct the phases of both folded and non-folded beat notes.

11. The system of claim 1 wherein the CAS module is further configured to correct for offset frequency fluctuations that are common for all modes.

12. A multiheterodyne spectroscopy (MHS) or dual-comb spectroscopy (DCS) system including a sample being a liquid, gaseous, or solid form substance, the system comprising:
   a first laser light source and a second laser light source;
   one or more photodetectors configured to detect a light beam derived from the first and second laser light sources and generate a signal from the detected light beam; and
   a signal processor configured to generate an output signal characterizing the sample, the signal processor comprising a computational adaptive sampling (CAS) module comprising a frequency mixer, a phase shifter, and an adaptive resampler and configured to perform a timing correction and phase correction on the signal.

13. The system of claim 12 wherein the first laser light source is configured to generate a light beam that is directed toward a beam splitter/combiner that creates two light beams, one directed toward the sample cell and the other directed toward a second beam splitter/combiner, resulting in a pre-sample laser light beam and a post-sample laser light beam.

14. The system of claim 12 wherein the second laser light source is configured to generate a light beam that is directed toward a beam splitter/combiner that generates two light beams.

15. The system of claim 12 further comprising one or more beam splitter/combiners configured to combine light beams derived from the first and second laser light sources.

16. The system of claim 12 further comprising one or more beam splitter/combiners configured to split light beams derived from the first and second laser light sources.

17. The system of claim 12 wherein the one or more photodetectors comprises a first photodetector configured to detect a pre-sample light beam and a second photodetector configured to detect a post-sample light beam.

18. The system of claim 12 wherein the CAS module is further configured to perform spectral folding on the signal.

19. The system of claim 12 wherein the CAS module is further configured to perform DC-centering of the beat notes and tuning of the lowest-frequency beat note to a frequency corresponding to a quarter of the free spectral range difference.

20. The system of claim 12 wherein the CAS module is further configured to perform frequency locking of the beat notes to a quarter of the free spectral range difference.

21. The system of claim 12 wherein the CAS module is further configured to perform frequency shifting of all beat notes equally in frequency by the difference in carrier-envelope offset (CEO) frequencies of the first and second laser light sources.

22. The system of claim 12 wherein the CAS module is further configured to separately correct phase fluctuations of folded and non-folded beat notes.

23. The system of claim 22 wherein the CAS module is further configured to correct repetition rate fluctuations and then perform offset frequency fluctuation correction.

24. The system of claim 22 wherein the CAS module is further configured to extract correction signals by digital mixing and apply filtering to two beat notes with the highest signal-to-noise ratio.

25. The system of claim 12 wherein the CAS module is further configured to perform frequency correction by timing correction.

26. The system of claim 12 wherein the CAS module is further configured to perform spectral unfolding to correct the phases of both folded and non-folded beat notes.

27. The system of claim 12 wherein the CAS module is further configured to correct for offset frequency fluctuations that are common for all modes.

28. The system of claim 12 further comprising an analog to digital converter coupled to the one or more photodetectors, the analog to digital converter configured to generate a digital signal derived from the first and second laser light sources.

29. The system of claim 28 wherein the signal processor is a digital signal processor.

30. The system of claim 12 wherein the signal processor is an analog signal processor.

* * * * *

UNITED STATES PATENT AND TRADEMARK OFFICE
CERTIFICATE OF CORRECTION

Page 1 of 1

PATENT NO.          : 11,015,975 B2
APPLICATION NO.     : 16/613614
DATED               : May 25, 2021
INVENTOR(S)         : Lukasz Sterczewski, Jonas Westberg and Gerard Wysocki It is certified that error appears in the above-identified patent and that said Letters Patent is hereby corrected as shown below:

In the Claims

Column 18 In Claim 4, Line 45, delete "heat" and insert --beat--.
Column 18 In Claim 5, Line 48, delete "heat" and insert --beat--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*